(12) United States Patent
Wu et al.

(10) Patent No.: US 11,937,181 B2
(45) Date of Patent: Mar. 19, 2024

(54) WAKE UP SIGNALING HANDLING IN DISCONTINUOUS RECEPTION

(71) Applicant: Nokia Technologies Oy, Espoo (FI)

(72) Inventors: Chunli Wu, Beijing (CN); Samuli Turtinen, Ii (FI); Jussi-Pekka Koskinen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/857,781

(22) Filed: Apr. 24, 2020

(65) Prior Publication Data

US 2020/0359314 A1   Nov. 12, 2020

(30) Foreign Application Priority Data

May 9, 2019   (WO) ................ PCT/CN2019/086263

(51) Int. Cl.
*H04W 52/02* (2009.01)
(52) U.S. Cl.
CPC ... *H04W 52/0216* (2013.01); *H04W 52/0235* (2013.01)
(58) Field of Classification Search
CPC ......... H04W 52/0216; H04W 52/0235; H04W 52/0229; Y02D 30/70
See application file for complete search history.

(56) References Cited

U.S. PATENT DOCUMENTS

| 9,872,252 | B1 | 1/2018 | Ang et al. | |
| 2015/0003311 | A1 | 1/2015 | Feuersaenger et al. | |
| 2015/0365995 | A1* | 12/2015 | Tabet | H04W 76/28 370/311 |
| 2016/0007292 | A1* | 1/2016 | Weng | H04W 52/0235 370/311 |
| 2017/0215222 | A1* | 7/2017 | Cheng | H04W 72/1278 |
| 2018/0332533 | A1 | 11/2018 | Bhattad et al. | |
| 2019/0037498 | A1* | 1/2019 | Tseng | H04W 52/0219 |
| 2020/0092808 | A1* | 3/2020 | Beale | H04W 52/0235 |

(Continued)

FOREIGN PATENT DOCUMENTS

| CN | 104205993 A | 12/2014 |
| CN | 109548054 A | 3/2019 |
| WO | 2019/032009 A1 | 2/2019 |

OTHER PUBLICATIONS

"New SID: Study on UE Power Saving in NR", 3GPP TSG RAN Meetings #80, RP-181463, Agenda : 9.1.8, CATT, Jun. 11-14, 2018, 5 pages.

(Continued)

*Primary Examiner* — Dinh Nguyen
(74) *Attorney, Agent, or Firm* — ALSTON & BIRD LLP (57) ABSTRACT

Embodiments of the present disclosure relate to handling wake up signaling in discontinuous reception. A method comprises determining, at an apparatus, whether an active time during which the apparatus monitors transmissions from a further apparatus overlaps with at least one occasion for monitoring wake up signaling. The method further comprises in response to the active time overlapping with the at least one occasion, skipping monitoring wake up signaling on the at least one occasion. As such, power consumption for monitoring wake up signaling during the active time can be reduced.

21 Claims, 5 Drawing Sheets

(56) References Cited

U.S. PATENT DOCUMENTS

2020/0314811 A1* 10/2020 Lin .................. H04L 5/0053

OTHER PUBLICATIONS

3rd Generation Partnership Project; Technical Specification Group Radio Access Network; NR; Medium Access Control (MAC) protocol specification (Release 15), 3GPP TS 38.321, V15.5.0, Mar. 2019, pp. 1-78.
"Avoiding the impact on MME", 3GPP TSG RAN WG1 Meeting #90bis, R1-1717922, Agenda : 6.2.6.1.1.2, SoftBank, Oct. 9-13, 2017, pp. 1-3.
"WUS consideration for efeMTC", 3GPP TSG RAN WG2 Meeting #99bis, R2-1710641, Agenda : 9.14.9, Intel Corporation, Oct. 9-Oct. 13, 2017, 7 pages.
International Search Report and Written Opinion received for corresponding Patent Cooperation Treaty Application No. PCT/CN2019/086263, dated Feb. 1, 2020, 9 pages.
"PDCCH-based power saving signal/channel", 3GPP TSG RAN WG1 #97, R1-1906980, Agenda : 7.2.9.1, Samsung, May 13-17, 2019, 12 pages.
"Further discussion on UE behavior upon reception of WUS", 3GPP TSG-RAN WG2 Meeting #106, R2-1906703, Agenda : 11.11.4.1, Qualcomm Inc, May 13-17, 2019, pp. 1-4.
"PDCCH-based power saving channel design", 3GPP TSG-RAN WG1 #97, R1-1907294, Agenda : 7.2.9.1, Qualcomm Incorporated, May 13-17, 2019, pp. 1-16.
International Preliminary Report on Patentability received for corresponding Patent Cooperation Treaty Application No. PCT/CN2019/086263, dated Sep. 7, 2021, 5 pages.
Extended European Search Report for European Application No. 19927582.7 dated Dec. 12, 2022, 11 pages.
Office Action for Chinese Application No. 2019800961921 dated Sep. 30, 2022, 14 pages.
Vivo, "PDCCH-Based Power Saving Signal/Channel", 3GPP TSG RAN WG1 #97, R1-1906170, (May 13-17, 2019), 10 pages.
Xiaomi Communications et al., "Is PDCCH Skipping Really Needed?", 3GPP TSG-RAN2# 106, R2-1906493, (May 13-17, 2019), 12 pages.
Office Action for Chinese Application No. 2019800961921 dated May 30, 2023, 16 pages.
Notice of Grant for Chinese Application No. 201980096192.1 dated Dec. 7, 2023, 6 pages.
Office Action for Indonesian Application No. P00202109532 dated Jan. 10, 2024, 6 pages.

* cited by examiner

WAKE UP SIGNALING HANDLING IN DISCONTINUOUS RECEPTION

RELATED APPLICATION

This application claims priority from PCT Application No.: PCT/CN2019/086263 filed on May 9, 2019, which is hereby incorporated in its entirety.

FIELD

Embodiments of the present disclosure generally relate to the field of telecommunication and in particular, to methods, apparatuses and computer readable storage media for handling wake up signaling in discontinuous reception.

BACKGROUND

Discontinuous reception (DRX) is designed to reduce power consumption by allowing a communication device to discontinuously receive information from another communication device. For example, when the DRX is enabled, user equipment (UE) may be configured with one or more DRX cycles, each comprising a DRX on-duration for monitoring a downlink channel from a network device. As such, the UE only needs to discontinuously monitor the downlink channel. Otherwise, the UE needs to continuously monitor the downlink channel.

Wake up signaling (WUS) is designed to allow the UE to skip monitoring the downlink channel when there is no transmission to be done, such that the power consumption can be further reduced. For example, if the network device intends to schedule the UE, it needs to send WUS to the UE during one or more WUS occasions so as to wake up the UE first. The UE will then monitor the control channel for scheduling information during a coming DRX on-duration.

SUMMARY

In general, example embodiments of the present disclosure provide a solution for handling wake up signaling in discontinuous reception.

In a first aspect, there is provided an apparatus. The apparatus comprises at least one processor; and at least one memory including computer program codes; the at least one memory and the computer program codes are configured to, with the at least one processor, cause the apparatus to determine whether an active time during which the apparatus monitors transmissions from a further apparatus overlaps with at least one occasion for monitoring wake up signaling; and in response to the active time overlapping with the at least one occasion, skip monitoring wake up signaling on the at least one occasion.

In a second aspect, there is provided an apparatus. The apparatus comprises at least one processor; and at least one memory including computer program codes; the at least one memory and the computer program codes are configured to, with the at least one processor, cause the apparatus to determine whether an active time during which the apparatus transmits information to a further apparatus overlaps with at least one occasion for transmitting wake up signaling; and in response to the active time overlapping with at least one occasion, skip transmitting wake up signaling on the at least one occasion.

In a third aspect, there is provided a method. The method comprises determining, at an apparatus, whether an active time during which the apparatus monitors transmissions from a further apparatus overlaps with at least one occasion for monitoring wake up signaling; and in response to the active time overlapping with the at least one occasion, skipping monitoring wake up signaling on the at least one occasion.

In a fourth aspect, there is provided a method. The method comprises determining, at an apparatus, whether an active time during which the apparatus transmits information to a further apparatus overlaps with at least one occasion for transmitting wake up signaling; and in response to the active time overlapping with at least one occasion, skipping transmitting wake up signaling on the at least one occasion.

In a fifth aspect, there is provided an apparatus. The apparatus comprises means for determining, at an apparatus, whether an active time during which the apparatus monitors transmissions from a further apparatus overlaps with at least one occasion for monitoring wake up signaling; and means for in response to the active time overlapping with the at least one occasion, skipping monitoring wake up signaling on the at least one occasion.

In a sixth aspect, there is provided an apparatus. The apparatus comprises means for determining, at an apparatus, whether an active time during which the apparatus transmits information to a further apparatus overlaps with at least one occasion for transmitting wake up signaling; and means for in response to the active time overlapping with at least one occasion, skipping transmitting wake up signaling on the at least one occasion.

In a seventh aspect, there is provided a computer readable medium comprising program instructions for causing an apparatus to perform at least the method according to the above third aspect.

In an eighth aspect, there is provided a computer readable medium comprising program instructions for causing an apparatus to perform at least the method according to the above fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehiclemounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

Figure 1:
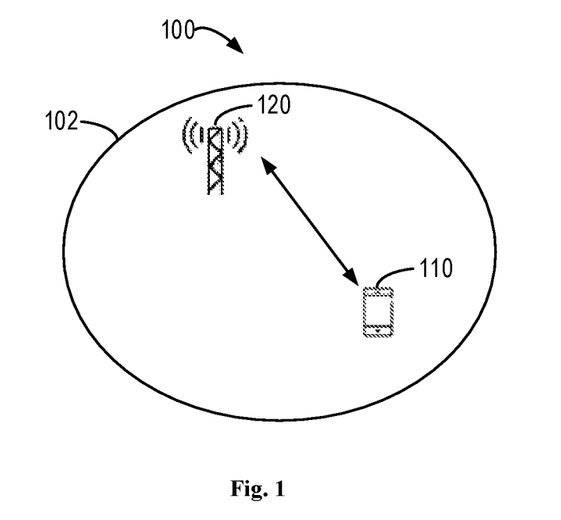
FIG. 1 illustrates an example communication network in which embodiments of the present disclosure may be implemented.

FIG. 1 shows an example communication network 100 in which embodiments of the present disclosure can be implemented. The network 100 includes a first device 110 and a second device 120 that can communicate with each other. In this example, the first device 110 is illustrated as a terminal device, and the second device 120 is illustrated as a network device serving the terminal device. Thus, the serving area of the second device 120 is called as a cell 102. It is to be understood that the number of network devices and terminal devices is only for the purpose of illustration without suggesting any limitations. The system 100 may include any suitable number of network devices and terminal devices adapted for implementing embodiments of the present disclosure. Although not shown, it would be appreciated that one or more terminal devices may be located in the cell 102 and served by the second device 120.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In the communication network 100, the first device 110 and the second device 120 can communicate data and control information to each other. In the case that the first device 110 is the terminal device and the second device 120 is the network device, a link from the second device 120 to the first device 110 is referred to as a downlink (DL), while a link from the first device 110 to the second device 120 is referred to as an uplink (UL).

The first device 110 and the second device 120 may be configured with discontinuous communication for the purpose of power saving. The discontinuous communication may include discontinuous reception (DRX) and/or discontinuous transmission (DTX). Either or both of the first and second devices 110 and 120 can be configured with DRX and/or DTX. For example, when the DRX is configured, the first device 110 discontinuously monitors information/data (for example, downlink information/data) transmitted from the second device 120. When the DTX is configured, the first device 110 discontinuously transmits information/data (for example, uplink information/data) to the second device 120. Similarly, the second device 120 may also be possibly configured with DRX or DTX.

When DRX is configured, to receive data, a device (for example, the first device 110) may first awake to monitor control information which indicates whether the device is scheduled to receive data and how the data can be received. A DRX cycle specifies the periodic repetition of the DRX on-duration followed by a possible period of inactivity. The DRX cycle includes an on-duration (also referred to "DRX on-duration") and an off-duration (also referred to "DRX off-duration"). The DRX on-duration is an active time during which a device (for example, the first device 110) monitors transmissions from a further device (for example, the second device 120) within a DRX cycle. The information may include control information transmitted via a physical downlink control channel (PDCCH).

To further reduce the power consumption, in some example embodiments, a device (for example, the first device 110) configured with DRX may be also configured with one or more WUS occasions for monitoring WUS from a further device (for example, the second device 120). If WUS is detected on at least one WUS occasion, the device may monitor transmissions from the further device during a DRX on-duration following the at least one WUS occasion. However, if no WUS is detected, the device may not monitor transmissions from the further device during a coming DRX on-duration. As such, the power consumption can be further reduced.

However, the active time during which the device (for example, the first device 110) monitors transmissions from the further device (for example, the second device 120) within a DRX cycle may extend beyond the DRX on-duration due to an event occurrence, which may result in the active time overlapping with at least one WUS occasion configured to the device for monitoring WUS. In this case, how to handle WUS occasions during the active time needs to be specified.

According to example embodiments of the present disclosure, there is provided a solution for handling WUS occasions during an active time in DRX. In this solution, if an active time overlaps with at least one occasion for monitoring WUS, the monitoring of WUS on the at least one occasion will be skipped. As such, this solution can reduce power consumption for monitoring WUS unnecessarily during the active time. Further, the solution can ensure continuous data transmissions when some WUS occasions are missed, which will be further described in detail below.

Figure 2:
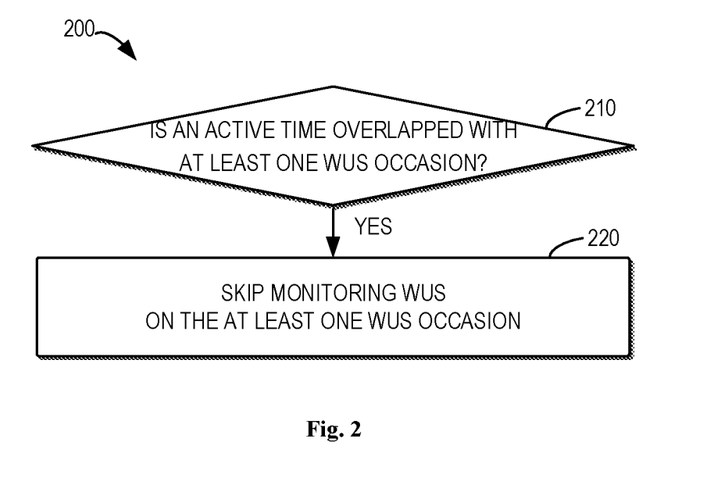
FIG. 2 illustrates a flowchart of an example method according to some example embodiments of the present disclosure.

Reference is now made to FIG. 2, which illustrates a flowchart of an example method 200 in accordance with some example embodiments of the present disclosure. For the purpose of discussion, the method 200 will be described from the perspective of the first device 110 with reference to FIG. 1. It would be appreciated that the method 200 may also be implemented at the second device 120 in FIG. 1.

At block 210, the first device 110 determines whether an active time during which the first device 110 monitors transmissions from the second device 120 overlaps with at least one occasion for monitoring WUS.

In some example embodiments, the first device 110 may be configured with DRX. When the first device 110 is a terminal device and the second device 120 is a network device, the first device 110 may receive one or more configurations from the second device 120. For example, the first device 110 may receive a configuration from the second device 120, which may configure, to the first device 110, one or more DRX cycles each comprising a DRX on-duration for monitoring transmissions from the second device 120. In addition, the first device 110 may receive a further configuration from the second device 120, which may configure, to the first device 110, one or more WUS occasions for monitoring WUS from the second device 120.

In some example embodiments, in response to being configured with one or more WUS occasions for monitoring WUS from the second device 120, the first device 110 may monitor WUS on the one or more WUS occasions. In response to the WUS being detected by the first device 110 on at least one WUS occasion, the first device 110 may monitor transmissions from the second device during a next DRX on-duration following the at least on WUS occasion.

In some example embodiments, the DRX on-duration is an active time during which the first device 110 monitors transmissions from the second device 120 within a DRX cycle. When the first device 110 is a terminal device and the second device 120 is a network device, the transmissions monitored by the first device 110 may be control information transmitted from the second device 120 via a physical downlink control channel (PDCCH). The active time may extend beyond the DRX on-duration due to an event occurrence (for example, a PDCCH including an uplink grant or an downlink grant is detected by the first device 110), which may start other timer such as an inactivity timer, a retransmission timer, a contention resolution timer, or a Hybrid Automatic Repeat request (HARQ) Round-Trip-Time (RTT) timer. As such, the active time may extend beyond a DRX on-duration within a DRX cycle, which may result in the active time overlapping with at least one of the one or more WUS occasions for monitoring WUS.

Referring back to FIG. 2, at block 220, if the active time overlaps with the at least one occasion, the first device 110 skips monitoring WUS on the at least one occasion.

Figure 3A:
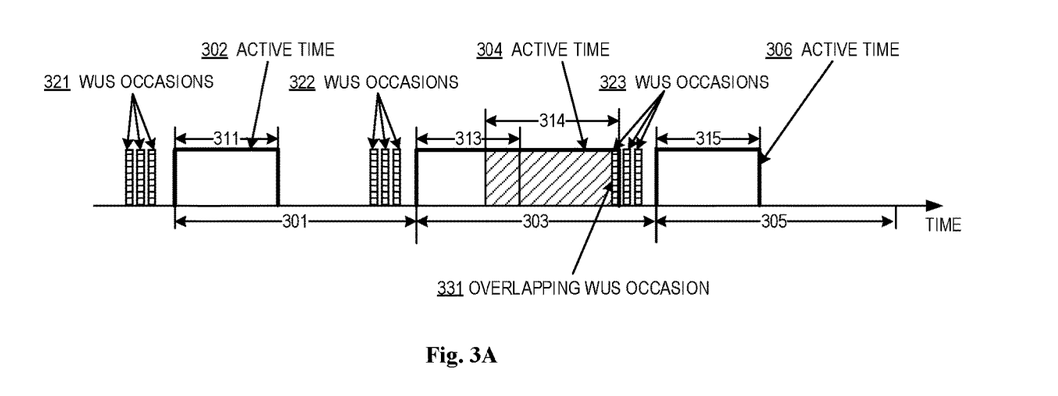
FIGS. 3A-3C illustrates example diagrams of WUS monitoring and DRX active times according to some example embodiments of the present disclosure.
Figure 3B:
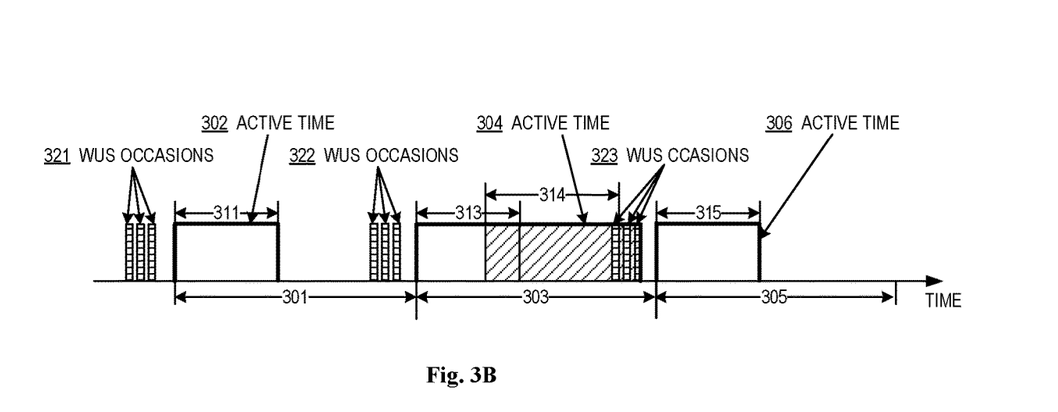
Figure 3C:
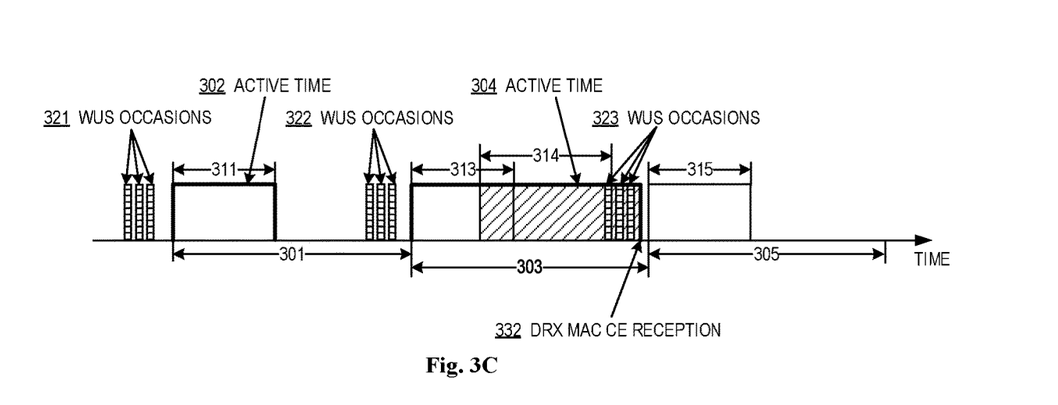

FIGS. 3A-3C illustrates example diagrams of WUS monitoring and DRX active times according to some example embodiments of the present disclosure. FIGS. 3A-3C each show three DRX cycles 301, 303 and 305. For example, the DRX cycle 301 comprises a DRX on-duration 311. The DRX cycle 303 comprises a DRX on-duration 313. The DRX cycle 305 comprises a DRX on-duration 315. FIGS. 3A-3C also show a plurality of occasions 321, 322 and 323 for monitoring WUS. For example, as shown in FIGS. 3A-3C, the WUS occasions 321 before the DRX on-duration 311 comprise three occasions. The WUS occasions 322 before the DRX on-duration 313 comprise three occasions. The WUS occasions 323 before the DRX on-duration 315 comprise three occasions. It would be appreciated that the number of the WUS occasions before each DRX on-duration is shown only for the purpose of illustration, without suggesting any limitation to the present disclosure. In some embodiments, there may be only one WUS occasion before each DRX on-duration. Alternatively, or in addition, in some embodiments, the numbers of WUS occasions before different DRX on-durations may be different.

As shown in FIG. 3A, for example, the first device 110 may monitor WUS from the second device 120 on the WUS occasions 321. If the WUS is detected on at least one of the WUS occasions 321, the first device 110 may monitor transmissions (such as, PDCCH) from the second device 120 during the DRX on-duration 311 following the WUS occasions 321. As such, the DRX on-duration 311 becomes an active time 302 during which the first device 110 monitors transmissions from the second device 120. If no event happens and thus no other timer is started, after the DRX on-duration 311, the first device 110 may enter a DRX off-duration during which the first device 110 is in a sleep state and does not monitor transmissions from the second device 120.

As shown in FIG. 3A, for example, the first device 110 may then monitor WUS from the second device 120 on the WUS occasions 322. If the WUS is detected on at least one of the WUS occasions 322, the first device 110 may monitor transmissions (such as, PDCCH) from the second device 120 during the DRX on-duration 313 following the WUS occasions 322. As such, the DRX on-duration 313 becomes an active time 304 during which the first device 110 monitors transmissions from the second device 120. If a certain event happens (for example, the first device 110 receives, via a PDCCH, an uplink grant for transmission to the second device 120 or a downlink grant for reception from the second device 120), some other timer (such as, an inactivity timer) may be started. The other timer triggered by the event may keep the first device 110 monitoring transmissions from the second device 120. The other timer may run for a period of time 314, resulting in the active time 304 extending beyond the DRX on-duration 313. As shown in FIG. 3A, the active time 304 overlaps with a WUS occasion 331 of the WUS occasions 323.

In some example embodiments, when the active time 304 overlaps with the WUS occasion 331 for monitoring WUS, the first device 110 may skip monitoring WUS on the overlapping WUS occasion 331. In some example embodiments, for example, the first device 110 may still monitor WUS on the rest of the WUS occasions 323. If WUS is detected on the rest of the WUS occasions 323, the first device 110 may monitor transmissions from the second device 120 during the DRX on-duration 315 following the WUS occasions 323. As such, the DRX on-duration 315 may become an active time 306 during which the first device 110 monitors transmissions from the second device 120. Alternatively, in some example embodiments, if WUS is not detected on the rest of the WUS occasions 323, the first device 110 may still monitor transmissions from the second device 120 during the DRX on-duration 315 following the WUS occasions 323, resulting in the DRX on-duration 315 becoming the active time 306. That is, if the active time 304 ends (such as, the data transmission completes) before the next DRX on-duration 315, and if the monitoring on at least one WUS occasion (such as, the WUS occasion 331) before the next DRX on-duration 315 is skipped, the first device 110 may still monitor transmissions from the second device 120 during the next DRX on-duration 315.

In some example embodiments, the active time may overlap with all of the WUS occasions prior to a next DRX on-duration. FIG. 3B illustrates such embodiments. As shown in FIG. 3B, the active time 304 may extend beyond the DRX on-duration 313 and overlap with all of the WUS occasions 323 before the next DRX on-duration 315. That is, the first device 110 will have no chance to detect the WUS before the next DRX on-duration 315. In some example embodiments, if the active time 304 ends before the next DRX on-duration 315, and if the monitoring on all of the WUS occasions 323 before the next DRX on-duration 315 is skipped, the first device 110 may still monitor transmissions from the second device 120 during the next DRX on-duration 315. Alternatively, or in addition, in some example embodiments, an OnDuration Timer for the DRX on-duration 315 may be started when the first device 110 is in active time at the beginning of the DRX on-duration 315 regardless of whether or not WUS is received before this DRX on-duration 315. As such, the active time 304 would not end during the DRX on-duration 315 since the first device 110 misses all of the WUS occasions 323.

In some example embodiments, the active time may be stopped by an indication received from the second device 120. In some example embodiments, for example, the indication may be transmitted from the second device 120 to the first device 110 via a Media Access Control (MAC) control element (CE). Alternatively, in some other embodiments, for example, the indication may be transmitted from the second device 120 to the first device 110 in downlink control information (DCI) via a PDCCH. It is to be understood that other ways for transmitting the indication are also applicable. FIG. 3C illustrates such embodiments in which the active time is stopped by the indication received from the second device 120. As shown in FIG. 3C, the active time 304 may extend beyond the DRX on-duration 313 and overlap with one or all of the WUS occasions 323 before the next DRX on-duration 315. Thus, the monitoring on one or all of the WUS occasions 323 will be skipped. The active time 304 may be stopped in response to receiving a DRX MAC CE from the second device 120, as shown by the DRX MAC CE reception 332 in FIG. 3C. That is, the active time 304 may end during the gap between the skipped at least one WUS occasion 323 and the next DRX on-duration 315. In some example embodiments, if the active time 304 is stopped by the DRX MAC CE (such as, the active time 304 ends during the gap between the WUS occasions 323 and the next DRX on-duration 315), the first device 110 may skip monitoring transmissions from the second device 120 during the next DRX on-duration 315, but only wait for a next WUS occasion.

Alternatively, in some example embodiments, if the active time 304 is stopped by the DRX MAC CE during the WUS occasions 323 and thus the active time 304 only overlaps with some of the WUS occasions 323, the first device 110 may also skip monitoring transmissions from the second device 120 during the next DRX on-duration 315.

In some example embodiments, one or more WUS occasions for monitoring WUS may be missed due to a skipping command. For example, the skipping command may be a command transmitted via a PDCCH (such as, via downlink control information), which indicates the first device 110 to skip monitoring of information from the second device 120 for a period of time. The skipping command may result in the monitoring of WUS on a WUS occasion being skipped. In some example embodiments, if the monitoring of WUS on at least one WUS occasion is skipped, the first device 110 may still monitor transmissions from the second device 120 during a DRX on-duration following the at least one WUS. In some embodiments, the PDCCH skipping command may not apply to WUS so that the first device 110 can monitor WUS even during the PDCCH skipping period to ensure that WUS will not be missed. The first device 110 may then decide whether or not to monitor transmissions from the second device 120 during a next DRX on-duration according to the result of WUS monitoring.

Figure 4:
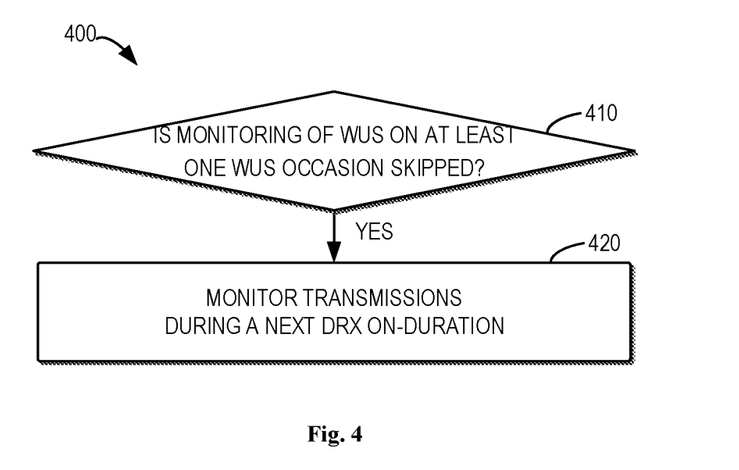
FIG. 4 illustrates a flowchart of an example method according to some example embodiments of the present disclosure.

FIG. 4 illustrates a flowchart of an example method 400 in accordance with some example embodiments of the present disclosure. For the purpose of discussion, the method 400 will be described from the perspective of the first device 110 with reference to FIG. 1. It would be appreciated that the method 400 may also be implemented at the second device 120 in FIG. 1.

At block 410, the first device 110 determines whether monitoring of WUS on at least one WUS occasion is skipped.

In some embodiments, the first device 110 may skip monitoring WUS on at least one WUS occasion due to the at least one WUS occasion being overlapped with an active time of the first device 110, as described above. Alternatively, or in addition, in some embodiments, the first device 110 may receive a skipping command from the second device 120, the skipping command indicating the first device 110 to skip monitoring information from the second device 120 for a period of time. In response to the period of time indicated by the skipping command overlaps with the at least one WUS occasion, the first device 110 may skip monitoring WUS on the at least one WUS occasion.

At block 420, in response to the monitoring of WUS on the at least one WUS occasion being skipped, the first device 110 monitors transmissions from the second device 120 during a next DRX on-duration following the at least one WUS occasion.

Figure 5:
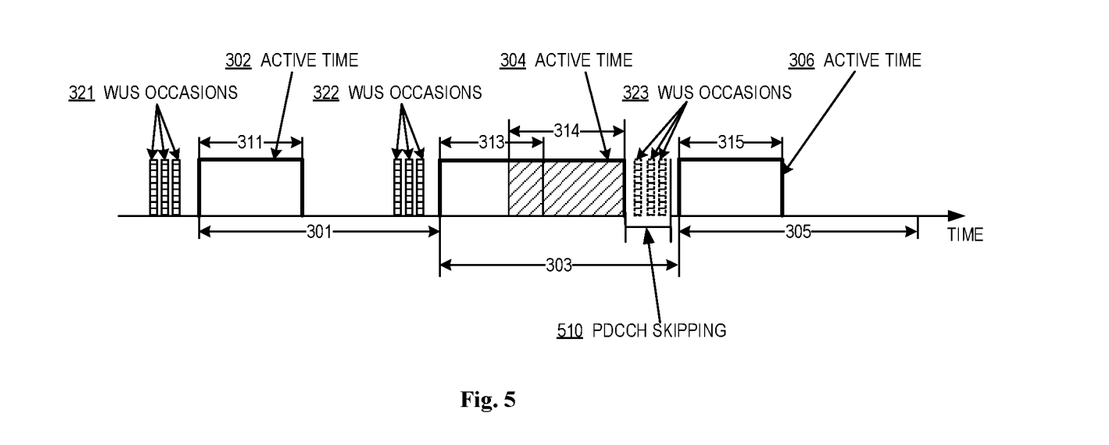
FIG. 5 illustrates an example diagram of WUS monitoring and DRX active times according to some example embodiments of the present disclosure.

FIG. 5 illustrates an example diagram of WUS monitoring and DRX active times according to some example embodiments of the present disclosure. In FIG. 5, the first device 110 may receive, from the second device 120, a skipping command which indicates the first device 110 to skip monitoring of information from the second device 120 for a period of time, as shown by PDCCH skipping 510 in FIG. 5. The PDCCH skipping 510 results in the monitoring of WUS on the WUS occasions 323 being skipped. In some example embodiments, in this case, the first device 110 may still monitor transmissions from the second device 120 during the next DRX on-duration 315 following the WUS occasions 323, as shown in FIG. 5.

Figure 6:
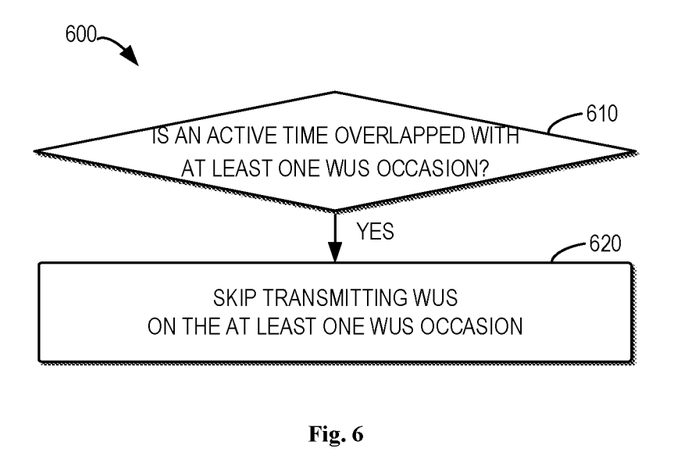
FIG. 6 illustrates a flowchart of an example method according to some example embodiments of the present disclosure.

FIG. 6 illustrates a flowchart of an example method 600 in accordance with some example embodiments of the present disclosure. For the purpose of discussion, the method 600 will be described from the perspective of the second device 120 with reference to FIG. 1. It would be appreciated that the method 600 may also be implemented at the first device 110 in FIG. 1.

At block 610, the second device 120 determines whether an active time during which the second device 120 transmits information to the first device 110 overlaps with at least one occasion for transmitting WUS.

At block 620, in response to the active time overlapping with at least one occasion, the second device 120 skips transmitting WUS on the at least one occasion.

In some example embodiments, the information transmitted to the first device comprises control information transmitted via a PDCCH.

In some example embodiments, there may be one or more occasions for transmitting WUS before a next discontinuous reception on-duration following the at least one occasion. The at least one occasion may comprise all of the one or more occasions.

In some example embodiments, prior to determining whether the active time overlaps with the at least one occasion, the second device 120 may transmit a first configuration to the first device 110, the first configuration configuring the at least one occasion to the first device 110. Alternatively, or in addition, in some example embodiments, prior to determining whether the active time overlaps with the at least one occasion, the second device 120 may also transmit a second configuration to the first device 110, the second configuration configuring the next discontinuous reception on-duration following the at least one occasion to the first device 110.

In some example embodiments, in response to the transmission of wake up signaling on the at least one occasion being skipped, the second device 120 may determine that a next discontinuous reception on-duration following the at least one occasion is available for transmitting information to the first device 110. For example, the second device 120 may transmit scheduling information (such as, an uplink or downlink grant via a PDCCH) to the first device 110 during the next discontinuous reception on-duration.

In some example embodiments, in response to the active time ending before a DRX on-duration and the transmission of wake up signaling on the at least one occasion before the DRX on-duration being skipped, the second device 120 may determine that a next discontinuous reception on-duration following the at least one occasion is available for transmitting information to the first device 110. For example, the second device 120 may transmit scheduling information (such as, an uplink or downlink grant via a PDCCH) to the first device 110 during the next discontinuous reception on-duration.

In some example embodiments, the second device 120 may transmit, to the first device 110, an indication to end the active time. For example, the second device 120 may transmit the indication via a MAC CE. In response to the indication being transmitted, the second device 120 may stop transmitting information to the first device 110 during the active time. In response to the active time ending before a next discontinuous reception on-duration following the at least one occasion and the transmission of wake up signaling on the at least one occasion being skipped, the second device 120 may determine that the next discontinuous reception on-duration is unavailable for transmitting information to the first device 110.

In some example embodiments, the first device 110 is a terminal device and the second device 120 is a network device.

Figure 7:
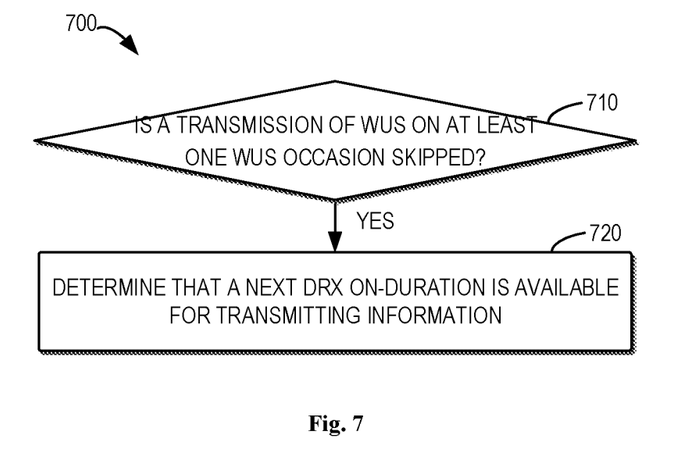
FIG. 7 illustrates a flowchart of an example method according to some example embodiments of the present disclosure.

FIG. 7 illustrates a flowchart of an example method 700 in accordance with some example embodiments of the present disclosure. For the purpose of discussion, the method 700 will be described from the perspective of the second device 120 with reference to FIG. 1. It would be appreciated that the method 700 may also be implemented at the first device 110 in FIG. 1.

At block 710, the second device 120 determines whether transmission of WUS on at least one WUS occasion is skipped.

In some embodiments, the second device 120 may skip transmission of WUS on at least one WUS occasion due to the at least one WUS occasion being overlapped with an active time of the second device 120, as described above.

Alternatively, or in addition, in some embodiments, the second device 120 may transmit a skipping command to the first device 110, the skipping command indicating the first device 110 to skip monitoring of information from the second device 120 for a period of time. For example, the second device 120 may not transmit information to the first device 110 during the period of time. In response to the period of time indicated by the skipping command overlaps with the at least one WUS occasion, the second device 120 may skip transmission of WUS on the at least one WUS occasion.

At block 720, in response to the transmission of WUS on the at least one WUS occasion being skipped, the second device 120 determines that a next discontinuous reception on-duration following the at least one WUS occasion is available for transmitting information to the first device 110. For example, the second device 120 may transmit scheduling information (such as, an uplink or downlink grant via a PDCCH) to the first device 110 during the next discontinuous reception on-duration.

In some example embodiments, an apparatus capable of performing the method 200 (for example, the first device 110 or the second device 120) may comprise means for performing the respective steps of the method 200. The means may be implemented in any suitable form. For example, the means may be implemented in a circuitry or software module.

In some example embodiments, the apparatus comprises means for determining whether an active time during which the apparatus monitors transmissions from a further apparatus overlaps with at least one occasion for monitoring wake up signaling; and means for in response to the active time overlapping with the at least one occasion, skipping monitoring wake up signaling on the at least one occasion.

In some example embodiments, the transmissions monitored by the apparatus comprise control information transmitted via a physical downlink control channel.

In some example embodiments, the apparatus further comprises means for prior to determining whether the active time overlaps with the at least one occasion, receiving a first configuration from the further apparatus, the first configuration configuring the at least one occasion to the apparatus.

In some example embodiments, the apparatus further comprises means for in response to the monitoring of wake up signaling on the at least one occasion being skipped, monitoring transmissions from the further apparatus during a next discontinuous reception on-duration following the at least one occasion.

In some example embodiments, the apparatus further comprises means for in response to the active time ending before a next discontinuous reception on-duration following the at least one occasion and the monitoring of wake up signaling on the at least one occasion being skipped, monitoring transmissions from the further apparatus during the next discontinuous reception on-duration.

In some example embodiments, the apparatus further comprises means for receiving, from the further apparatus, an indication to end the active time; means for in response to the indication being received, stopping monitoring transmissions from the further apparatus during the active time; and means for in response to the active time ending before a next discontinuous reception on-duration following the at least one occasion and the monitoring of wake up signaling on the at least one occasion being skipped, skipping monitoring transmissions from the further apparatus during the next discontinuous reception on-duration.

In some example embodiments, the means for receiving the indication comprises means for receiving the indication via a MAC control element.

In some example embodiments, there are one or more occasions for monitoring wake up signaling before the next discontinuous reception on-duration and the at least one occasion comprises all of the one or more occasions.

In some example embodiments, the apparatus further comprises means for prior to determining whether the active time overlaps with the at least one occasion, receiving a second configuration from the further apparatus, the second configuration configuring the next discontinuous reception on-duration to the apparatus.

In some example embodiments, the apparatus is a terminal device and the further apparatus is a network device.

Some of the example embodiments may provide advantages to a scenario where WUS and DRX are both configured for a terminal device (such as, UE). For example, power consumption of the terminal device can be reduced due to the terminal device deciding not to monitor WUS occasions during the time of the overlap of the WUS occasions with the active time of the terminal device.

Some of the example embodiments may align the functions at the terminal device and at the network device. For example, let us assume that the network device would unilaterally decide not to transmit WUS on the WUS occasion overlapping the active time of the terminal device even though the network device needs to communicate to the terminal device during the next DRX on-duration. Let us further assume that the terminal device would follow existing WUS monitoring rules and listen to the WUS during the overlap period. In such situation, the terminal device might get a wrong impression according to which the terminal device can sleep at the next DRX on-duration. This is because the terminal device does not receive any WUS during the WUS occasion, which is due to the network device deciding not to utilize the WUS occasion overlapping with the active time. To avoid such misunderstandings between the terminal device and the network device, both devices need to have specified common rules to follow.

In some example embodiment, the WUS may be a group WUS to be received by many terminal devices. In such case, the importance of common rules to follow may be emphasized. It is assumed that the network device transmits a group WUS even though the network device only needs to communicate with one terminal device (for example, the first device 110). In such case, other terminal devices may also need to wake up to and decode the group WUS during the WUS occasion and may be required to wake up for the next DRX on-duration given the network device having a need to communicate with the terminal device 110. This would increase the power consumption of not only the terminal device 110 but also of other terminal devices. This could be avoided by the terminal device 110 and the network device 120 following the proposed rules of not listening to the WUS and not transmitting the WUS during the WUS occasion overlapping with the active time of the terminal device 110, but instead utilizing the next DRX on-period for communication. In this way, the other terminal devices would not need to wake up for the next DRX on-duration, as such group WUS is not transmitted.

In some example embodiments, an apparatus capable of performing the method 400 (for example, the first device 110 or the second device 120) may comprise means for performing the respective steps of the method 400. The means may be implemented in any suitable form. For example, the means may be implemented in a circuitry or software module.

In some example embodiments, the apparatus comprises means for determining whether monitoring of WUS on at least one WUS occasion is skipped; and means for in response to the monitoring of WUS on the at least one WUS occasion being skipped, monitoring transmissions from a further apparatus during a next discontinuous reception on-duration following the at least one WUS occasion.

In some example embodiments, an apparatus capable of performing the method 600 (for example, the first device 110 or the second device 120) may comprise means for performing the respective steps of the method 600. The means may be implemented in any suitable form. For example, the means may be implemented in a circuitry or software module.

In some example embodiments, the apparatus comprises means for determining whether an active time during which the apparatus transmits information to a further apparatus overlaps with at least one occasion for transmitting wake up signaling; and means for in response to the active time overlapping with at least one occasion, skipping transmitting wake up signaling on the at least one occasion.

In some example embodiments, the information transmitted to the first device comprises control information transmitted via a physical downlink control channel.

In some example embodiments, the apparatus further comprises means for prior to determining whether the active time overlaps with the at least one occasion, transmitting a first configuration to the further apparatus, the first configuration configuring the at least one occasion to the further apparatus.

In some example embodiments, the apparatus further comprises means for in response to the transmission of wake up signaling on the at least one occasion being skipped, determining that a next discontinuous reception on-duration following the at least one occasion is available for transmitting information to the further apparatus.

In some example embodiments, the apparatus further comprises means for in response to the active time ending before a next discontinuous reception on-duration following the at least one occasion and the transmission of wake up signaling on the at least one occasion being skipped, determining that the next discontinuous reception on-duration is available for transmitting information to the further apparatus.

In some example embodiments, the apparatus further comprises means for transmitting, to the further apparatus, an indication to end the active time; means for in response to the indication being transmitted, stopping transmitting information to the further apparatus during the active time; and means for in response to the active time ending before a next discontinuous reception on-duration following the at least one occasion and the transmission of wake up signaling on the at least one occasion being skipped, determining that the next discontinuous reception on-duration is unavailable for transmitting information to the further apparatus.

In some example embodiments, the means for transmitting the indication comprises means for transmitting the indication via a MAC control element.

In some example embodiments, there are one or more occasions for transmitting wake up signaling before the next discontinuous reception on-duration and the at least one occasion comprises all of the one or more occasions.

In some example embodiments, the apparatus further comprises means for prior to determining whether the active time overlaps with the at least one occasion, transmitting a second configuration to the further apparatus, the second configuration configuring the next discontinuous reception on-duration to the further apparatus.

In some example embodiments, the apparatus is a network device and the further apparatus is a terminal device.

In some example embodiments, an apparatus capable of performing the method 700 (for example, the first device 110 or the second device 120) may comprise means for performing the respective steps of the method 700. The means may be implemented in any suitable form. For example, the means may be implemented in a circuitry or software module.

In some example embodiments, the apparatus comprises means for determining whether transmission of WUS on at least one WUS occasion is skipped; and means for in response to the transmission of WUS on the at least one WUS occasion being skipped, determining that a next discontinuous reception on-duration following the at least one WUS occasion is available for transmitting information to the further apparatus.

Figure 8:
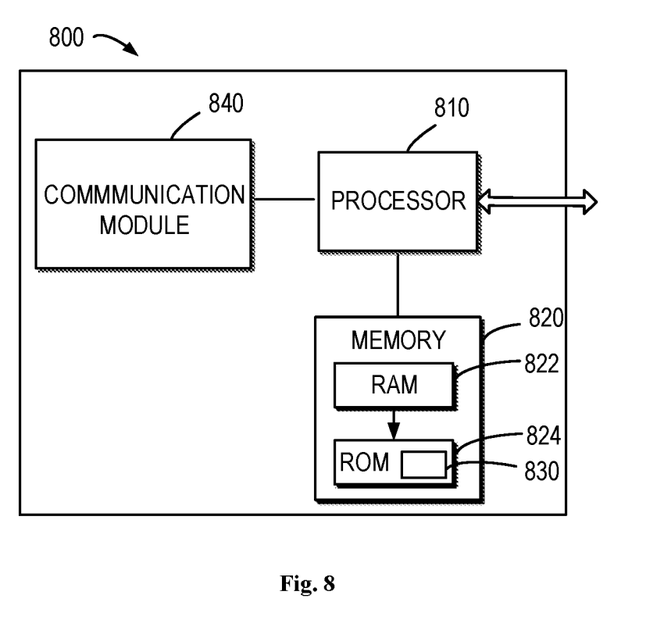
FIG. 8 illustrates a simplified block diagram of an apparatus that is suitable for implementing embodiments of the present disclosure.

FIG. 8 is a simplified block diagram of a device 800 that is suitable for implementing embodiments of the present disclosure. The device 800 may be provided to implement the communication device, for example the first device 110, the first device 111 or the second device 120 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 824. The processor 810 may perform any suitable actions and processing by loading the program 830 into the RAM 822.

The embodiments of the present disclosure may be implemented by means of the program 830 so that the device 800 may perform any process of the disclosure as discussed with reference to FIGS. 2, 4, 6 and/or 7. The embodiments of the present disclosure may also be implemented by hardware or by a combination of software and hardware.

Figure 9:
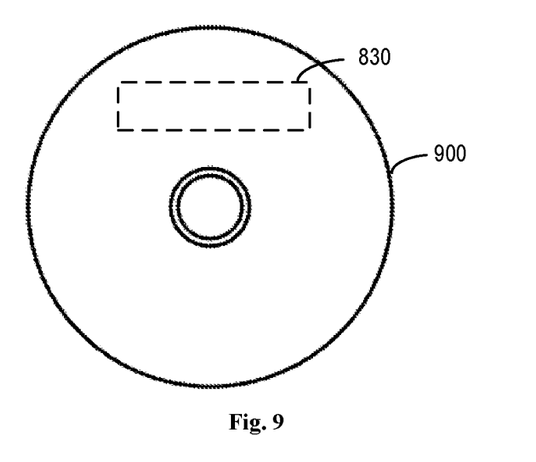
FIG. 9 illustrates a block diagram of an example computer readable medium in accordance with some example embodiments of the present disclosure.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 in form of CD or DVD. The computer readable medium has the program 830 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the apparatus 800 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the apparatus 800 may be instead comprised in the distributed unit, and at least some of the described processes may be performed by the distributed unit.

In an embodiment, the execution of at least some of the functionalities of the apparatus 800 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the apparatus 800 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 as described above with reference to FIG. 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:
    at least one processor; and
    at least one memory storing instructions thereon that, when executed by
    the at least one processor, cause the apparatus to perform at least:
        determining a plurality of occasions for monitoring wake up signaling for a discontinuous reception cycle having an associated discontinuous reception on-duration following the plurality of occasions;
        determining that i) an active time during which the apparatus monitors transmissions from a second apparatus overlaps a first set of at least one occasion of the plurality of occasions and ii) the active time does not overlap a second set of at least one occasion of the plurality of occasions;
        based on determining that the active time overlaps the first set, skipping monitoring wake up signaling on the first set; and
        monitoring wake up signaling on at least one occasion in the second set to determine whether to monitor transmissions from the second apparatus during the associated discontinuous reception on-duration following the plurality of occasions.

2. The apparatus of claim 1, wherein the transmissions monitored by the apparatus comprise control information via a physical downlink control channel.

3. The apparatus of claim 1, wherein the instructions stored on the at least one memory, when executed by the at least one processor, further cause the apparatus to perform:
    prior to determining the plurality of occasions, receiving a first configuration from the second apparatus, the first configuration for configuring the plurality of occasions to the apparatus.

4. The apparatus of claim 1, wherein the instructions stored on the at least one memory, when executed by the at least one processor, further cause the apparatus to perform:

receiving, from the second apparatus, an indication to end the active time;
based on the indication, stopping monitoring transmissions from the second apparatus during the active time; and
skipping monitoring transmissions from the second apparatus during the associated discontinuous reception on-duration.

5. The apparatus of claim 4, wherein the instructions stored on the at least one memory, when executed by the at least one processor, further cause the apparatus to perform:
receiving the indication via a medium access control (MAC) control element.

6. The apparatus of claim 1, wherein the instructions stored on the at least one memory, when executed by the at least one processor, further cause the apparatus to perform:
receiving a second configuration from the second apparatus, the second configuration for configuring the associated discontinuous reception on-duration to the apparatus.

7. The apparatus of claim 1, wherein the apparatus is a terminal device and the second apparatus is a network device.

8. An apparatus comprising:
at least one processor; and
at least one memory storing instructions thereon that, when executed by
at least one processor, cause the apparatus to perform at least:
determining a plurality of occasions for transmitting wake up signaling to a second apparatus for a discontinuous reception cycle having an associated discontinuous reception on-duration following the plurality of occasions;
determining that i) an active time during which the apparatus transmits information to the second apparatus overlaps a first set of at least one occasion of the plurality of occasions and ii) the active time does not overlap a second set of at least one occasion of the plurality of occasions;
based on determining that the active time overlaps the first set, skipping transmitting wake up signaling on the first set; and
transmitting wake up signaling on at least one occasion in the second set to indicate whether the second apparatus needs to monitor transmissions from the apparatus during the associated discontinuous reception on-duration following the plurality of occasions.

9. The apparatus of claim 8, wherein the information transmitted to the second apparatus comprises control information via a physical downlink control channel.

10. The apparatus of claim 8, wherein the instructions stored on the at least one memory, when executed by the at least one processor, further cause the apparatus to perform:
transmitting a first configuration to the second apparatus, the first configuration for configuring the plurality of occasions to the second apparatus.

11. The apparatus of claim 8, wherein the active time ends before the associated discontinuous reception on-duration.

12. The apparatus of claim 8, wherein the instructions stored on the at least one memory, when executed by the at least one processor, further cause the apparatus to perform:
transmitting, to the second apparatus, an indication to end the active time; and
based on the indication being transmitted, stopping transmitting information to the second apparatus during the active time; and determining that the associated discontinuous reception on-duration is unavailable for transmitting information to the second apparatus.

13. The apparatus of claim 12, wherein the instructions stored on the at least one memory, when executed by the at least one processor, further cause the apparatus to perform:
transmitting the indication via a medium access control (MAC) control element.

14. The apparatus of claim 8, wherein the instructions stored on the at least one memory, when executed by the at least one processor, further cause the apparatus to perform:
transmitting a second configuration to the second apparatus, the second configuration for configuring the associated discontinuous reception on-duration to the second apparatus.

15. The apparatus of claim 8, wherein the apparatus is a network device and the second apparatus is a terminal device.

16. A method comprising:
determining, at an apparatus, a plurality of occasions for monitoring wake up signaling for a discontinuous reception cycle having an associated discontinuous reception on-duration following the plurality of occasions;
determining that i) an active time during which the apparatus monitors transmissions from a second apparatus overlaps a first set of at least one occasion of the plurality of occasions and ii) the active time does not overlap a second set of at least one occasion of the plurality of occasions;
based on determining that the active time overlaps the first set, skipping monitoring wake up signaling on the first set; and
monitoring wake up signaling on at least one occasion in the second set to determine whether to monitor transmissions from the second apparatus during the associated discontinuous reception on-duration following the plurality of occasions.

17. The method of claim 16, wherein the apparatus is a terminal device and the second apparatus is a network device.

18. The method of claim 16, wherein the transmissions monitored by the apparatus comprise control information via a physical downlink control channel.

19. The method of claim 16, further comprising:
prior to determining the plurality of occasions, receiving a first configuration from the second apparatus, the first configuration for configuring the plurality of occasions to the apparatus.

20. The method of claim 16, further comprising:
receiving a second configuration from the second apparatus, the second configuration for configuring the associated discontinuous reception on-duration to the apparatus.

21. A method comprising:
determining, at an apparatus, a plurality of occasions for transmitting wake up signaling to a second apparatus for a discontinuous reception cycle having an associated discontinuous reception on-duration following the plurality of occasions;
determining that i) an active time during which the apparatus transmits information to the second apparatus overlaps a first set of at least one occasion of the plurality of occasions and ii) the active time does not overlap a second set of at least one occasion of the plurality of occasions;

based on determining that the active time overlaps the first set, skipping transmitting wake up signaling on the first set; and transmitting wake up signaling on at least one occasion in the second set to indicate whether the second apparatus needs to monitor transmissions from the apparatus during the associated discontinuous reception on-duration following the plurality of occasions.

\* \* \* \* \*

UNITED STATES PATENT AND TRADEMARK OFFICE
CERTIFICATE OF CORRECTION

PATENT NO. : 11,937,181 B2
APPLICATION NO. : 16/857781
DATED : March 19, 2024
INVENTOR(S) : Chunli Wu et al.

Page 1 of 1

It is certified that error appears in the above-identified patent and that said Letters Patent is hereby corrected as shown below:

In the Drawings

In sheet 2 of 5, FIG. 3B, reference numeral 323, Line 1, delete "CCASIONS" and insert -- OCCASIONS --, therefor.

In the Claims

In Column 19, Line 28, Claim 8, delete "at least" and insert -- the at least --, therefor.

Signed and Sealed this
Sixth Day of May, 2025

Coke Morgan Stewart
*Acting Director of the United States Patent and Trademark Office*